Patented Aug. 8, 1950

2,517,691

UNITED STATES PATENT OFFICE 2,517,691

PURIFICATION OF METHYL ANTHRANILATE

Merton W. Long, Jr., Midland, Mich., assignor to The Dow Chemical Company, Midland, Mich., a corporation of Delaware No Drawing. Application June 20, 1949, Serial No. 100,303

3 Claims. (Cl. 260—471)

This invention relates to a new method of purifying methyl anthranilate.

Methyl anthranilate is commonly prepared from anthranilic acid made by the action of hypochlorite and alkali on phthalimide. The acid is esterified directly with methanol in the presence of sulfuric acid. The crude methyl anthranilate thus produced is usually purified by careful fractional distillation. The resulting material, having a freezing point of at least 24.5° C. and known as "technical" grade, is used principally as a perfume ingredient in soaps.

However, for use as a flavoring and as an ingredient in the more delicate perfumes, this technical methyl anthranilate is further purified to remove substances which, though present only in minute traces, impart an "off" odor to the product. The purification treatment necessary to produce methyl anthranilate of the flavoring or "purified" grade involves several cycles of fractional solidification each followed by a rectification. Since each fractional solidification requires several days, the treatment is time-consuming, laborious, and expensive.

It is therefore the principal object of the present invention to provide a process for purifying methyl anthranilate to flavoring grade which eliminates the repeated fractional solidifications and rectifications heretofore necessary.

According to the invention, methyl anthranilate, either crude or of technical grade, is purified by dispersing it in water at a temperature above the freezing point of the ester and containing a small proportion of an emulsifying agent. The resulting dispersion is then cooled to a temperature below the freezing point of the ester, thus causing the latter to separate from the dispersion as a discrete solid phase. This operation leaves the product substantially free of the unknown impurities which produce an off odor, since these seem to remain dissolved or dispersed in the aqueous medium. The solidified ester may then be recovered from the cooled dispersion, as by filtration, and then washed with water and dried.

This procedure, which is simple, rapid and inexpensive, is highly effective in making methyl anthranilate of flavoring grade. Ordinarily, only a single application of the treatment is necessary to make a product meeting flavor and odor specifications. However, if necessary, the process may be repeated one or more times with a given batch of material. Optionally, it may be combined with a purification of the type employed heretofore, except that the procedure for the latter may be greatly simplified since the burden of purification is carried by the new treatment.

The emulsifying agent used in the process may be any surface-active or wetting agent capable of suspending oily materials in water. Synthetic detergents, such as the hymolal salts, e. g. sodium lauryl sulfate, and the aryl alkyl sulfonates, which form no precipitate in hard waters are preferred. However, ordinary soaps are effective if demineralized water is used. An extensive list of surface-active agents now available commercially is found in Chemical Industries, vol. 61, pp. 811–824 (Nov. 1947). So far as known, virtually all of these agents are operable in the invention. In general, the concentration of emulsifying agent in the water should be between about 0.1 and about 2 per cent by weight.

In a preferred method of carrying out the invention, the methyl anthranilate to be purified is first melted and then is added gradually with agitation to an at least equal volume of water containing an emulsifying agent. The water is also preferably at a temperature above the freezing point of the ester, i. e. above about 25° C., before the ester is stirred in, although the water may be heated to the operating temperature in the early stages of the addition. When addition of the ester is complete, the resulting dispersion is cooled, with agitation being continued, until the ester is solidified, usually in the form of fine crystals or granules which remain suspended mechanically in the water. Agitation is then stopped and the mixture is filtered to separate the ester. The latter is then washed thoroughly with water, and is dried, after which it is ready for use as a flavoring or high-grade perfume ingredient.

The following examples will further illustrate the invention.

Example 1

A charge of 500 grams of technical methyl anthranilate (freezing point 24.5° C.) was melted and poured slowly with agitation into an equal volume of water at about 25° C. containing about 10 cc. of Solvadine NC solution (an alkyl aryl sulfonate wetting agent). The resulting fine milky emulsion was cooled gradually with stirring to a temperature of 11° C., by which time the methyl anthranilate had crystallized fully. The entire mixture was then filtered through a basket centrifuge. The methyl anthranilate residue in the basket was washed with cool water until the wash water showed no sign of soapiness.

After removal from the centrifuge, the crystals were dried. The resulting product had a freezing point not appreciably higher than the original material, but all trace of off odor had been eliminated.

*Example 2*

Another batch of technical methyl anthranilate was purified according to the procedure of Example 1 except that the emulsifying agent used was 5 to 10 grams of a triethanolamine soap of coconut oil fatty acids. The product had no trace of off odor.

What is claimed is:

1. A method of purifying technical grade methyl anthranilate which comprises dispersing the compound in water at a temperature above the melting point of the compound and containing a small proportion of an emulsifying agent, cooling the resulting dispersion to a temperature below the melting point of the compound until the compound separates as a solid phase, and separating the solidified compound from the cooled dispersion.

2. A method of treating methyl anthranilate of less than flavoring grade to render it of higher grade which comprises agitating the compound while molten with an at least equal volume of water at a temperature above 25° C. and containing from 0.1 to 2 per cent by weight of an emulsifying agent to form a dispersion, cooling the resulting dispersion with agitation at a temperature below 25° C. until methyl anthranilate separates from the dispersion as a finely-divided solid, filtering the cooled dispersion to separate the solid product, washing the solid thus separated, and thereafter drying it.

3. A method according to claim 2 wherein the emulsifying agent is an alkyl aryl sulfonate.

MERTON W. LONG, Jr.

REFERENCES CITED

The following references are of record in the file of this patent:

Food inspection and Analysis, by Leach (1920), page 562.